(12) United States Patent
Merrill et al.

(10) Patent No.: US 9,150,324 B2
(45) Date of Patent: Oct. 6, 2015

(54) SYSTEMS AND METHODS FOR DYNAMICALLY APPLYING OUTSERTS TO ARTICLES

(75) Inventors: Dale C. Merrill, Enfield, NH (US); Francois Gagnon, Laval (CA)

(73) Assignee: New Jersey Machine, Inc., Lebanon, NH (US)

( * ) Notice: Subject to any disclaimer, the term of this patent is extended or adjusted under 35 U.S.C. 154(b) by 0 days.

(21) Appl. No.: 13/324,580

(22) Filed: Dec. 13, 2011

(65) Prior Publication Data

US 2013/0146208 A1 Jun. 13, 2013

(51) Int. Cl.

| | |
|---|---|
| *B29C 65/00* | (2006.01) |
| *B32B 37/00* | (2006.01) |
| *B29C 45/00* | (2006.01) |
| *B29C 47/00* | (2006.01) |
| *B29C 43/02* | (2006.01) |
| *B29C 49/00* | (2006.01) |
| *B29C 51/00* | (2006.01) |
| *B29D 24/00* | (2006.01) |
| *B29D 29/00* | (2006.01) |
| *B29C 43/10* | (2006.01) |
| *A01J 21/00* | (2006.01) |
| *A01J 25/12* | (2006.01) |
| *A21C 3/00* | (2006.01) |
| *A21C 11/00* | (2006.01) |
| *A23G 1/20* | (2006.01) |

(Continued)

(52) U.S. Cl.
CPC . *B65C 9/14* (2013.01); *B29C 31/10* (2013.01); *B32B 38/00* (2013.01); *B32B 38/18* (2013.01); *B32B 38/1858* (2013.01); *B65C 9/36* (2013.01); *B65H 1/00* (2013.01); *B65H 3/00* (2013.01); *B65H 3/08* (2013.01); *B65H 3/0808* (2013.01); *B65H 3/0816* (2013.01); *B65H 5/00* (2013.01); *B65H 5/22* (2013.01)

(58) Field of Classification Search
CPC ........ B29C 31/00; B32B 38/00; B32B 38/18; B32B 38/1858; B65H 1/00; B65H 3/00; B65H 3/08; B65H 3/0808; B65H 3/0816; B65H 5/00; B65H 5/22
USPC .......... 156/285, 286, 382; 264/511, 553, 571; 425/504, 388
See application file for complete search history.

(56) References Cited

U.S. PATENT DOCUMENTS

| | | | |
|---|---|---|---|
| 4,010,299 A | | 3/1977 | Hershey, Jr. et al. |
| 4,293,365 A | * | 10/1981 | Geyser et al. ................. 156/364 |

(Continued)

OTHER PUBLICATIONS

Photo of NJM Model 270, product dated Dec. 29, 1981, 1 page.

(Continued)

*Primary Examiner* — Richard Crispino
*Assistant Examiner* — Matthew Hoover
(74) *Attorney, Agent, or Firm* — Gesmer Updegrove LLP

(57) ABSTRACT

An outsert application system is disclosed that includes a vacuum assembly and a pivot arm. The vacuum assembly is for accommodating passage of a vacuum to an engagement surface at a first end thereof for engaging an outsert. The pivot arm is rotatably coupled at a first end thereof to a second end of the vacuum assembly, and the vacuum assembly is adapted to rotate with respect to the pivot arm about a first axis. A second end of the pivot arm is adapted for rotation about a second axis that is substantially parallel with the first axis. The system further includes a translation device that causes the first axis to move with respect to the second axis as the vacuum assembly rotates about the first axis.

23 Claims, 18 Drawing Sheets

(51) Int. Cl.

| | |
|---|---|
| *A23G 3/02* | (2006.01) |
| *A23P 1/00* | (2006.01) |
| *B28B 11/08* | (2006.01) |
| *B28B 21/36* | (2006.01) |
| *B29C 55/28* | (2006.01) |
| *B65C 9/14* | (2006.01) |
| *B65H 3/08* | (2006.01) |
| *B65H 3/00* | (2006.01) |
| *B32B 38/18* | (2006.01) |
| *B32B 38/00* | (2006.01) |
| *B65H 5/00* | (2006.01) |
| *B65H 5/22* | (2006.01) |
| *B29C 31/10* | (2006.01) |
| *B65H 1/00* | (2006.01) |
| *B65C 9/36* | (2006.01) |

(56) References Cited

U.S. PATENT DOCUMENTS

| | | | | |
|---|---|---|---|---|
| 4,355,967 | A * | 10/1982 | Hellmer | 425/503 |
| 4,425,181 | A * | 1/1984 | Bahr et al. | 156/497 |
| 4,812,195 | A | 3/1989 | Vijuk | |
| 4,853,063 | A * | 8/1989 | Basgil et al. | 156/238 |
| 5,149,587 | A | 9/1992 | Hill et al. | |
| 5,225,022 | A | 7/1993 | Baker et al. | |
| 5,234,735 | A | 8/1993 | Baker et al. | |
| 5,480,370 | A | 1/1996 | Gelsinger | |
| 6,158,778 | A | 12/2000 | Vijuk et al. | |
| 6,213,185 | B1 * | 4/2001 | Asghar et al. | 156/556 |
| 6,349,973 | B1 | 2/2002 | Vijuk et al. | |
| 6,808,480 | B2 | 10/2004 | Neubauer et al. | |
| 7,175,586 | B2 | 2/2007 | Mattila et al. | |
| 7,398,871 | B1 * | 7/2008 | Basgil et al. | 198/473.1 |
| 7,438,108 | B2 * | 10/2008 | Hansch | 156/568 |
| 7,621,862 | B2 | 11/2009 | Neubauer et al. | |

OTHER PUBLICATIONS

Pages from the website mgsmachine.com showing various outsert application machines, printed on Feb. 28, 2012, 3 pages.

* cited by examiner

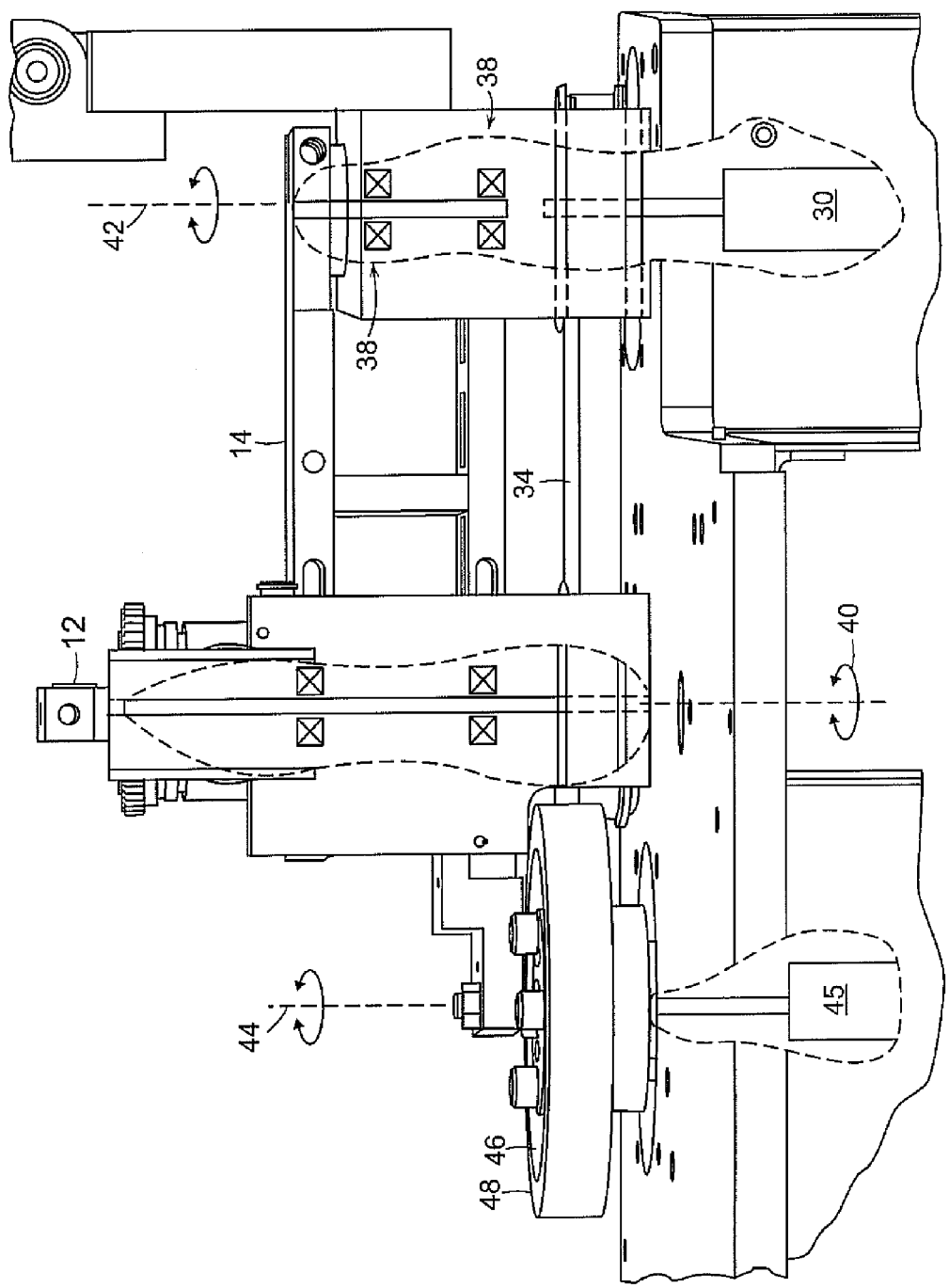

SYSTEMS AND METHODS FOR DYNAMICALLY APPLYING OUTSERTS TO ARTICLES

BACKGROUND

The present invention generally relates to label and outsert application systems, and relates in particular to outsert application systems that continuously apply outserts to articles such as bottles or containers.

As used herein, the term outsert generally means any single sheet, folded or booklet bound article that is intended to be applied to an article such as a container for providing information to a purchaser of the article. For example, the information may include dosage information for a medication contained within the container, or conflicting medication information for a medication, or medication conditions requirements information etc.

U.S. Pat. No. 4,425,181 discloses an outsert application system that applies outserts to containers on a conveyor via a pickup arm that moves into contact with an end of a magazine of outserts, then rotates toward a container, and then urges toward a container thereby applying the outsert to a container. The pickup arm then moves back to a home position, and is then ready to move the next outsert to a new container. The system also provides that multiple outserts (e.g., 3) may be applied to a set of containers at a time by momentarily stopping the movement of the containers. Such stoppage of the movement of the containers, however, is undesirable in certain applications as it requires stopping the movement of the containers for short periods of time while the set of outserts are applied to the containers.

U.S. Pat. No. 4,853,063 discloses an outsert application system that includes a spring loaded hopper that provides outserts for sequential contact with an adhesive transfer tape web. The sequentially adhered outserts are then applied to containers on a conveyor belt via a peel plate. Such an outsert applications system may be suitable for use with relatively thin outserts, but is not however, likely to be able to function properly with rather thick outserts that may not peel efficiently and consistently off of the peel plate onto containers.

U.S. Pat. No. 6,213,185 discloses a system for applying outserts to containers that includes a conveyor belt that provides outserts individually to a feeder device, wherein the feeder device applies the outserts individually to containers that each include a strip of previously applied glue. The feeder device includes a pair of rotationally oppositely driven feed screws that capture a single outsert between the feed screws such that each outsert is urged individually toward a container. Any modification, however, of such a system to accommodate different sizes of outserts would require replacing at least the feed screws to accommodate the different sizes of the outserts.

U.S. Pat. No. 7,398,871 discloses a rotary outsert application system that includes a star wheel having a set of outsert support plates for applying outserts to containers. The system appears to require however, different star wheel assemblies for outserts of different sizes such as outserts having different widths.

Certain commercial outsert application systems, such as the TOPSERTER II and SIDEWINDER glue and apply outserting machines sold by MGS Machine Corporation of Maple Grove, Minn., include a rotary pick and place mechanism that employs multiple vacuum arms that move in generally cycloidal motions. Such motion of the vacuum arms, however, do not match the speed and direction of the outserts with the bottles, and may not effectively process rather thick outserts. Other prior outsert application systems, such as the NJM Model 270 Literature Applying Machine previously sold by NJM Packaging, Inc. of Lebanon, N.H., involved transferring outserts from a J-chute to a linearly and rotationally actuatable turret via an intermediate spindle arm, and then from the turret to bottles. Such a system, therefore, involved the multiple steps of transferring outserts among two devices between the J-chute and the bottles. The use of such an intermediate transfer assembly however, adds complexity and cost.

There remains a need, therefore, for a system for continuously applying outserts to articles that efficiently switches between applying outserts of different thicknesses and widths.

SUMMARY

In accordance with an embodiment, the invention provides an outsert application system that includes a vacuum assembly and a pivot arm. The vacuum assembly is for accommodating passage of a vacuum to an engagement surface at a first end thereof for engaging an outsert. The pivot arm is rotatably coupled at a first end thereof to a second end of the vacuum assembly, and the vacuum assembly is adapted to rotate with respect to the pivot arm about a first axis. A second end of the pivot arm is adapted for rotation about a second axis that is substantially parallel with the first axis. The system further includes a translation device that causes the first axis to move with respect to the second axis as the vacuum assembly rotates about the first axis.

In accordance with another embodiment, the invention provides a method of applying outserts to containers. The method includes the steps of: engaging an outsert from an outsert hopper at a first end of a vacuum assembly, rotating said first end of the vacuum assembly with respect to a pivot arm about a first axis, translating the first axis by rotating the pivot arm about a second axis that is substantially parallel with the first axis, and applying the outsert to a container, said translating of the first axis during rotation of the first end of said vacuum assembly facilitating the engaging of the outsert from the outsert hopper. In certain embodiments, the step of rotating the first end of the vacuum assembly with respect to the pivot arm about the first axis either precedes or follows the step of translating the first axis by rotating the pivot arm about the second axis between the steps of engaging the outsert from the outsert hopper and applying the outsert to a container.

BRIEF DESCRIPTION OF THE DRAWINGS

The following description may be further understood with reference to the accompanying drawings in which:

FIG. 3A shows an illustrative diagrammatic rear view of the system of FIG. 1 showing the motor and axis of rotation;

The drawings are shown for illustrative purposes only.

DETAILED DESCRIPTION

Figure 1:
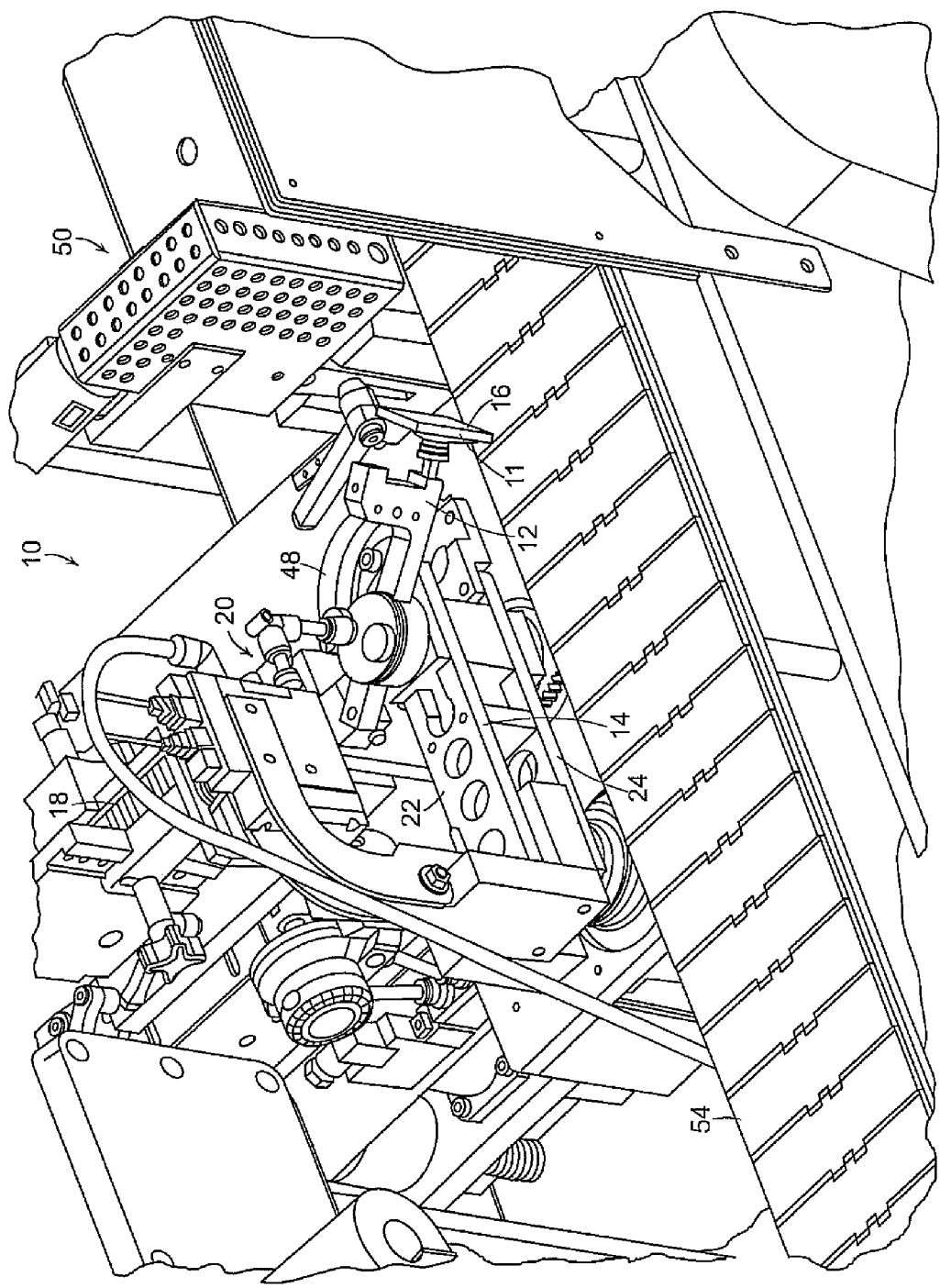
FIG. 1 shows an illustrative diagrammatic view of an outsert application system in accordance with an embodiment of the invention.
Figure 2:
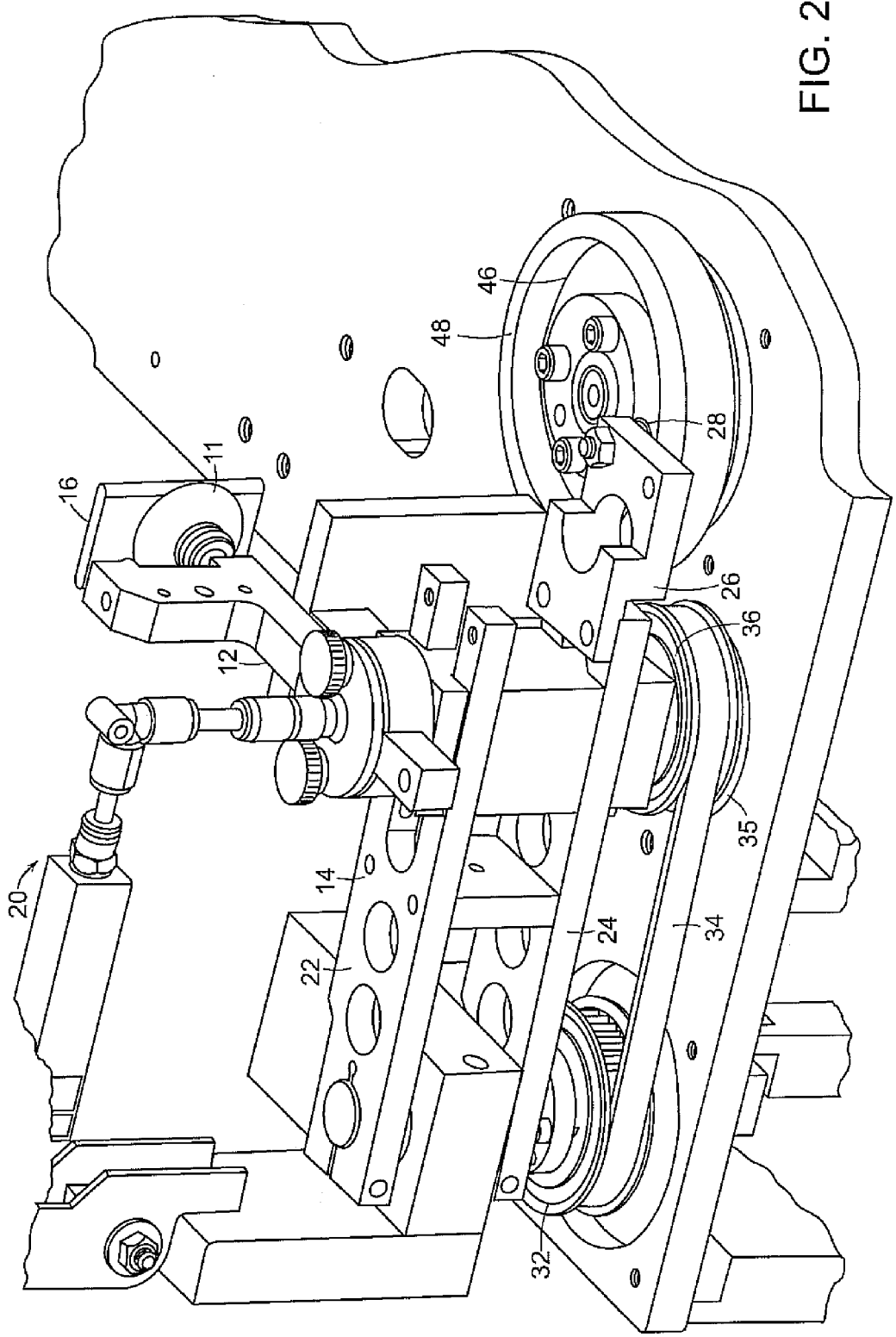
FIG. 2 shows an enlarged illustrative diagrammatic view of the rotating vacuum assembly and pivot arm of the system of FIG. 1.

With reference initially to FIGS. 1 and 2, an outsert application system 10 in accordance with an embodiment of the invention includes a vacuum assembly such as a vacuum arm 12 that is rotatably mounted at one end thereof on a pivot arm 14. The other end of the vacuum arm 12 includes a suction cup 11 that is adapted to contact an outsert 16 from an outsert hopper 18, and to maintain contact with the outsert using vacuum provided by a source line 20 from within the vacuum arm 12. In an embodiment, the pivot arm 14 includes top and bottom members 22, 24, and the bottom member 24 includes an extension 26 having a cam follower 28 coupled thereto.

With further reference to FIG. 3A, a motor 30 is coupled to a drive wheel 32 that drives a belt 34 and thereby driven wheel 36 that is coupled to the vacuum arm 12 for providing rotation of the vacuum arm 12 with respect to one end of the pivot arm 14. As also shown in FIG. 3A, an opposite end of the pivot arm is rotatably coupled to a housing as generally shown at 38. This assembly permits the vacuum arm 12 to rotate with respect to the pivot arm 14 about an axis 40 (as shown in FIG. 3A) and permits the pivot arm to rotate about an axis 42 that is coincident with the axis of rotation of the shaft of the motor 30.

The cam follower 28 is received within a cam path 46 of a cam device 48 (as shown in FIG. 2), and as the cam device rotates about an axis 44 (using a motor 45), the cam path 46 causes the cam follower to urge the first end of the pivot arm and the entire vacuum arm assembly to rotate about the axis 42 in small radial amounts that are based on the minimum distance needed for the largest diameter suction cup that may be used to rotate into position to pick up an outsert without rubbing against the outsert. As the pivot arm 14 rotates, the distance between the drive wheel 32 and driven wheel 36 remains constant. The cam device 48 therefore functions as a translation device for the pivot arm, causing the axis of rotation of the vacuum arm to move during operation. An enlarged opening 35 may be provided in a support surface that permits the driven wheel 36 to both rotate and move with the pivot arm 14 as the translation device moves the pivot arm 14. In other embodiments, other types of translation devices may be employed as discussed further below with reference to FIG. 11.

Figure 3B:
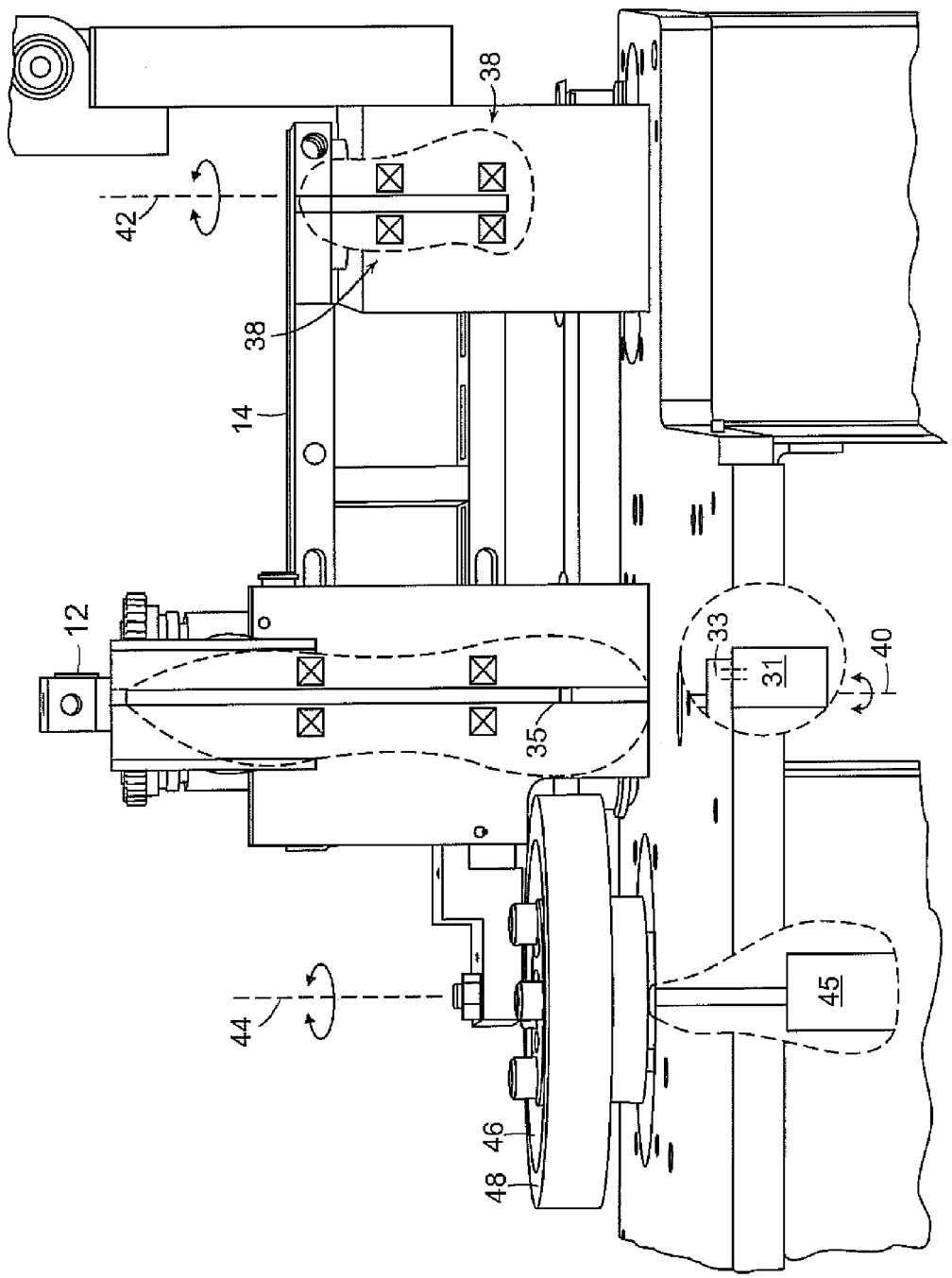
FIG. 3B shows an illustrative diagrammatic rear view of a system in accordance with another embodiment of the invention that employs a Schmidt coupling to drive the vacuum arm.

As shown in FIG. 3B, rather than using a belt to drive the vacuum arm, a Schmidt coupling 33 may be employed between a motor 31 and the shaft 35 that rotates the vacuum arm. The Schmidt coupling provides that the shaft 35 may be moved small amounts in a direction that is orthogonal to the axis of rotation of the shaft 25 while the cam device 48 is being rotated, thereby moving the axis of rotation of the shaft 25 with respect to the axis of rotation 42' of the pivot arm 14. A Schmidt coupling provides that an output drive axis may be provided along an axis of rotation 44' that is displaced from but parallel with a drive axis of a motor.

As also shown in FIG. 1, a hot glue applicator station 50 may be used to apply glue to containers prior to having an outsert applied to each article. In other embodiments, the glue may be applied to each outsert prior to having the outsert applied to an article, such as a container or bottle.

Figure 4A:
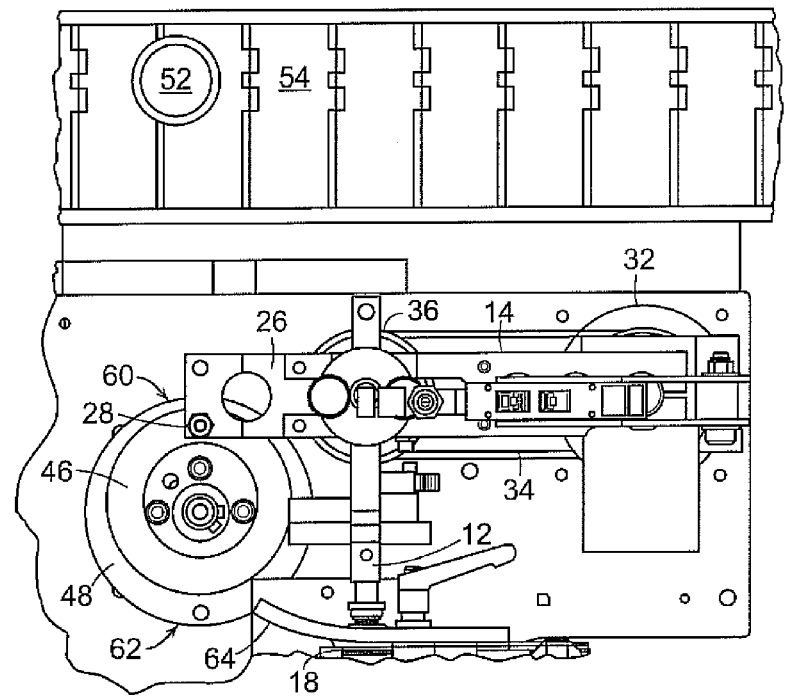
FIGS. 4A-4J show illustrative diagrammatic views of the rotating vacuum assembly and pivot arm at different stages of rotation while applying an outsert to a container using the system of FIG. 1.
Figure 4B:
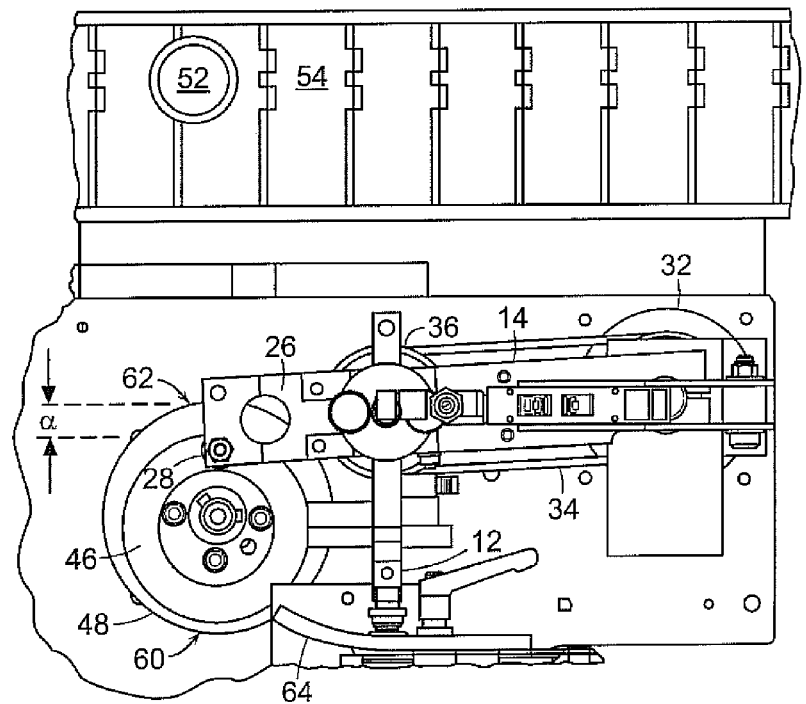

With reference to FIGS. 4A-4J, during application of an outsert 16 from an outsert hopper 18, the cam device 48 is controlled to provide that non-deflecting portions 60 of the cam path 46 do not cause the pivot arm 14 to be rotated, while deflecting portions 62 of the cam path 46 do cause the pivot arm 14 to be rotated a small amount (as shown at α in FIG. 4B).

Figure 4C:
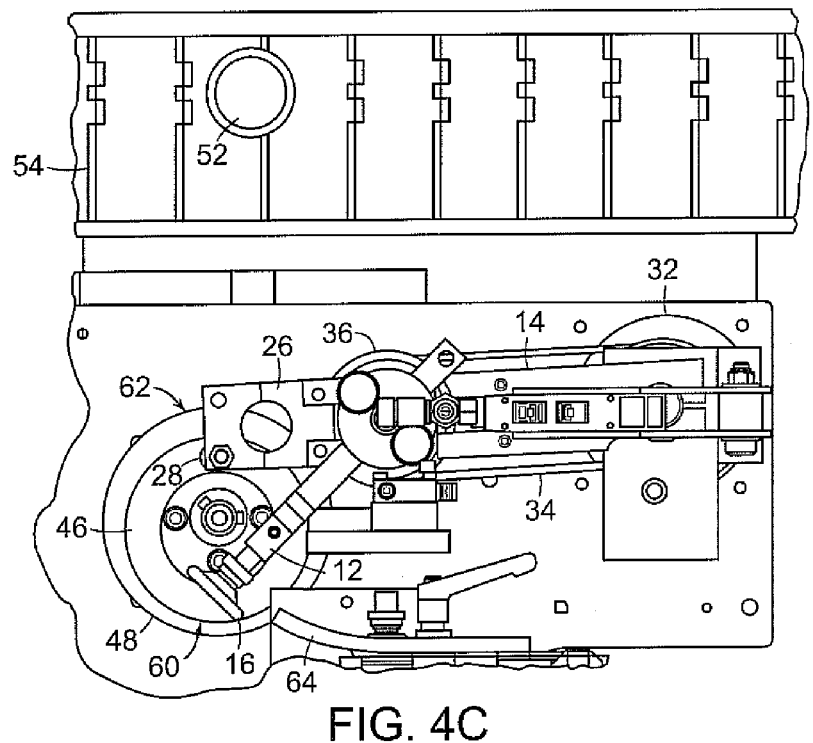

As shown in FIG. 4C, when guide 64 (not shown in FIGS. 1 and 2) may also be employed to facilitate capturing relatively thick outsells from the outsert hopper. The use of the guide 64 is further detailed in FIG. 5 wherein it may be seen that after the suction cup 11 engages an outsert, the upper and lower facing surface of the outsert are held by the vacuum against the contact surfaces of the guides 64 and 65. The guides 64 and 65 therefore retain each outsert as the vacuum arm draws the outsert along the guides 64, 65.

Glue may be added at this stage to the outsert rather than being added to each container by the glue applicator station 50 in certain embodiments. As discussed in further detail below, a further guide or sets of guides may also be provided on the other side of each outsert to keep each retrieved outserts properly oriented. In further embodiments, a shelf may also be provided under the outserts, and a pusher device may be attached to contact the trailing edge of each outsert to move the heavier outserts along the path to the container as also discussed in further detail below.

Figure 4D:
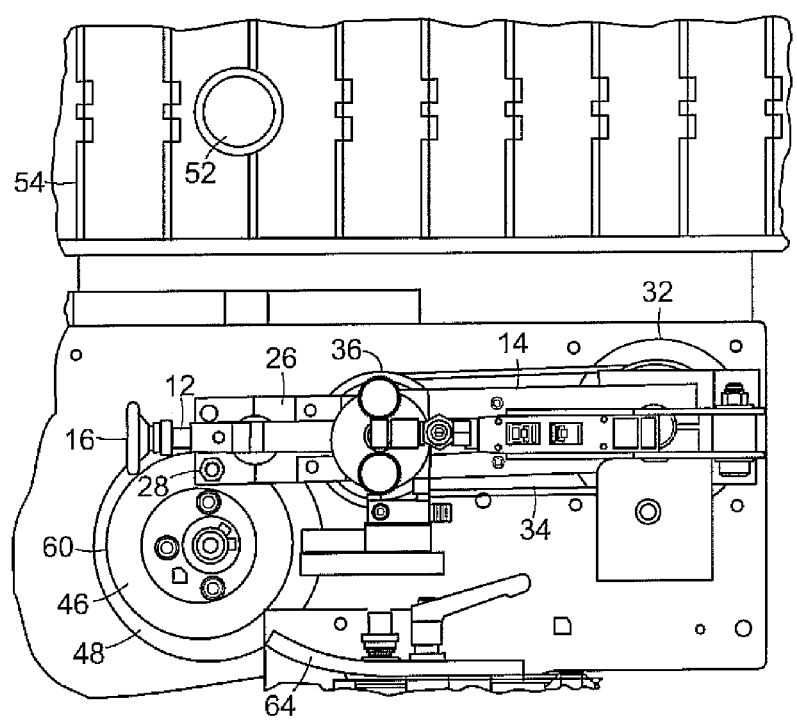
Figure 4E:
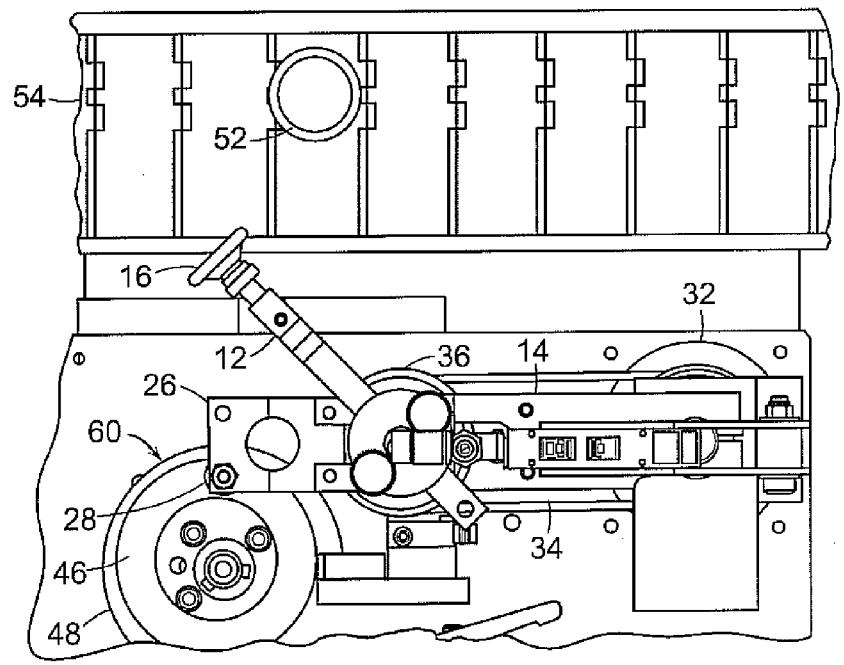
Figure 4F:
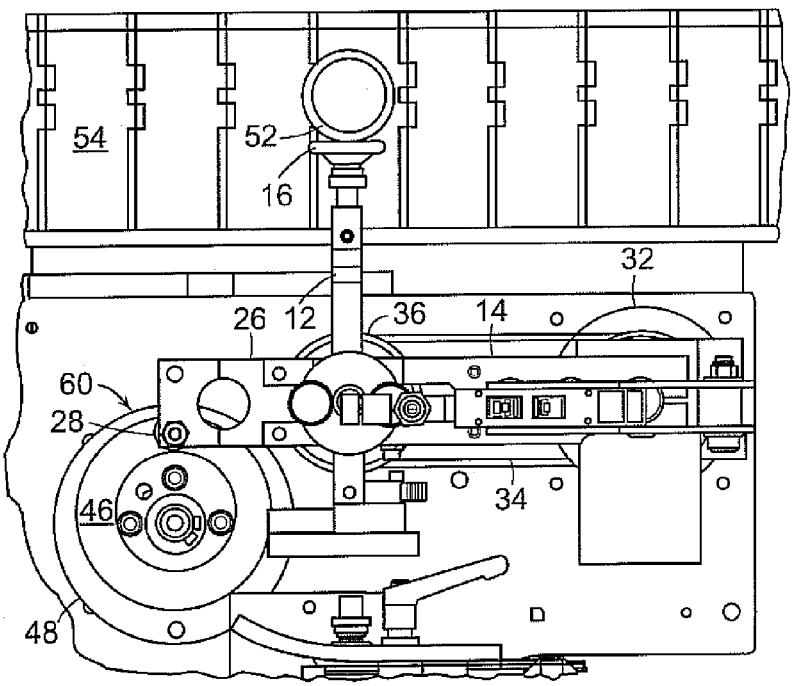
Figure 4G:
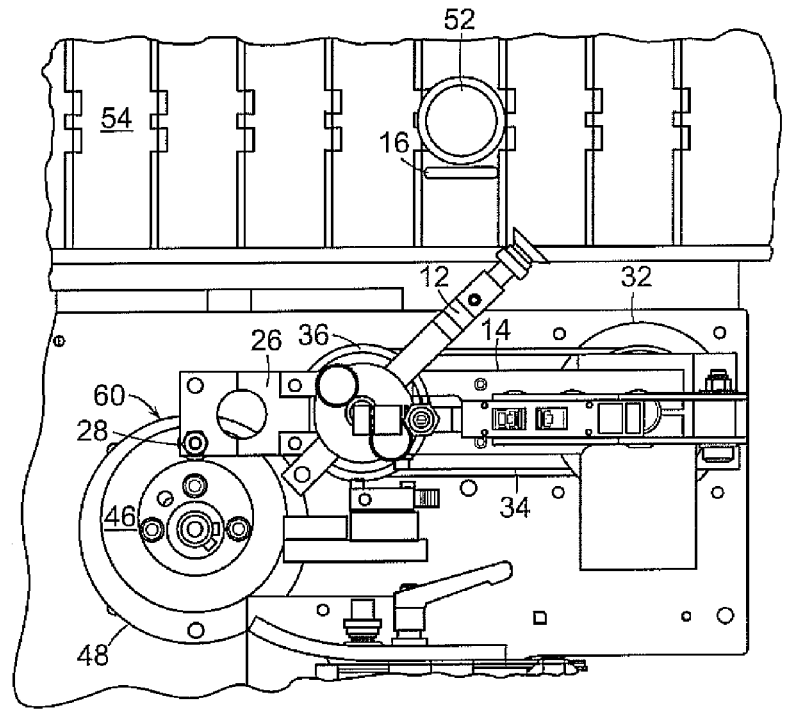
Figure 4H:
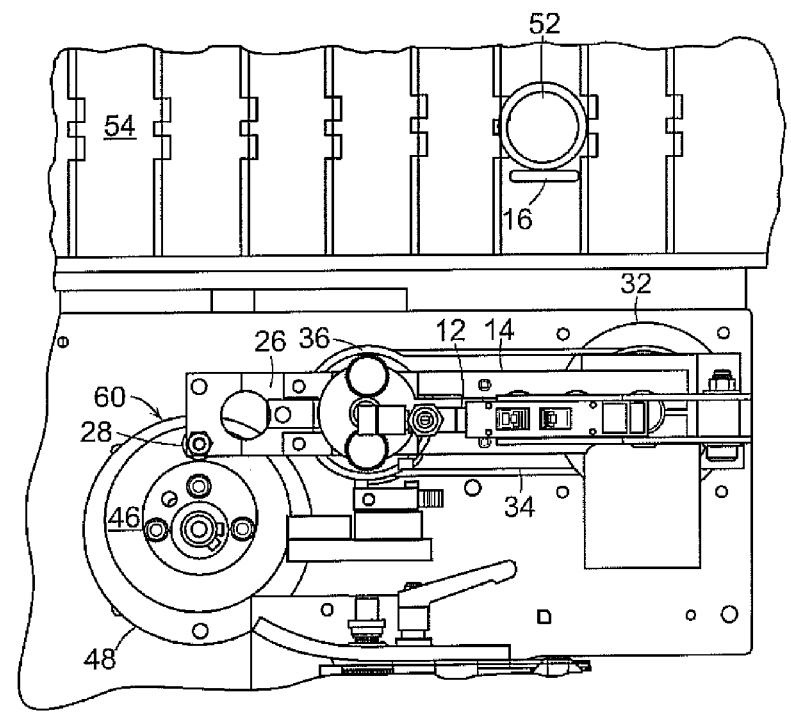
Figure 4I:
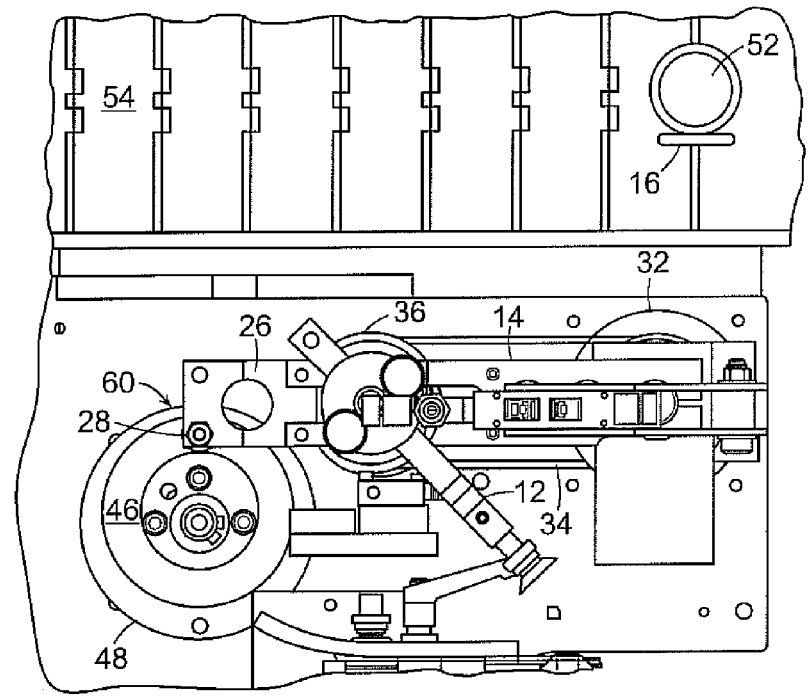

As shown in FIGS. 4D-4F, when the vacuum arm is rotated closer to the conveyor 54 carrying a container 52, the non-deflecting portion 60 of the cam path 46 approaches the position of the cam follower 28, causing the deflection of the pivot arm 14 to return to zero deflection.

Figure 4J:
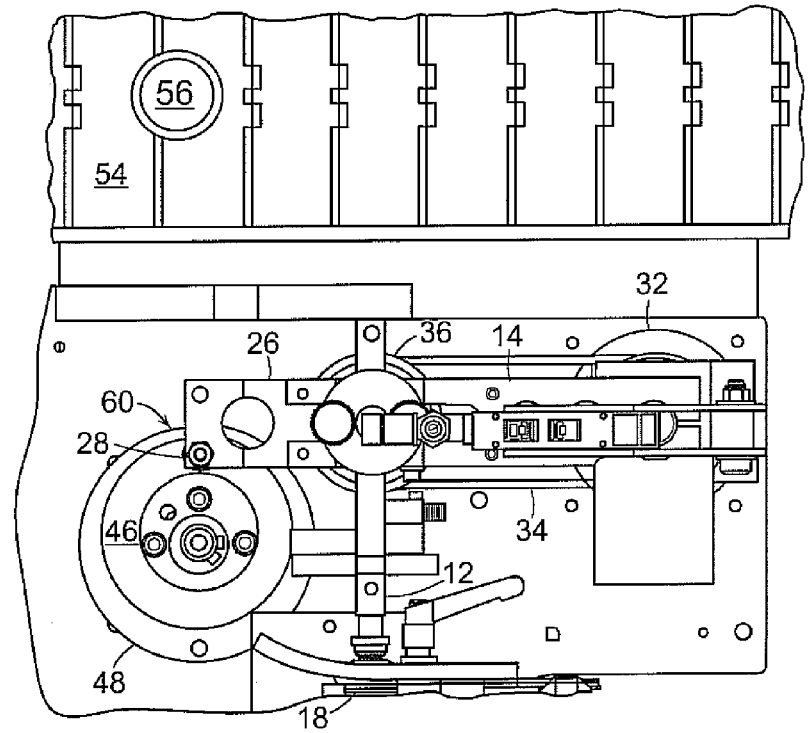

As shown in FIGS. 4G-4J, the outsert 16 becomes applied to a container 52, and the vacuum arm 12 returns to its home position, ready to be urged toward the outsert hopper again to engage a new outsert for application to the next container 56 (shown in FIG. 4J). The vacuum arm velocity is controlled such that the velocity of the outside surface of the outsert is matched to the velocity of the container. The outsert thickness is included in the calculation of vacuum arm velocity. The matched velocity may occur only over a short portion of the vacuum arm's travel, e.g., 15 degrees from either side of the container application position.

Figure 6:
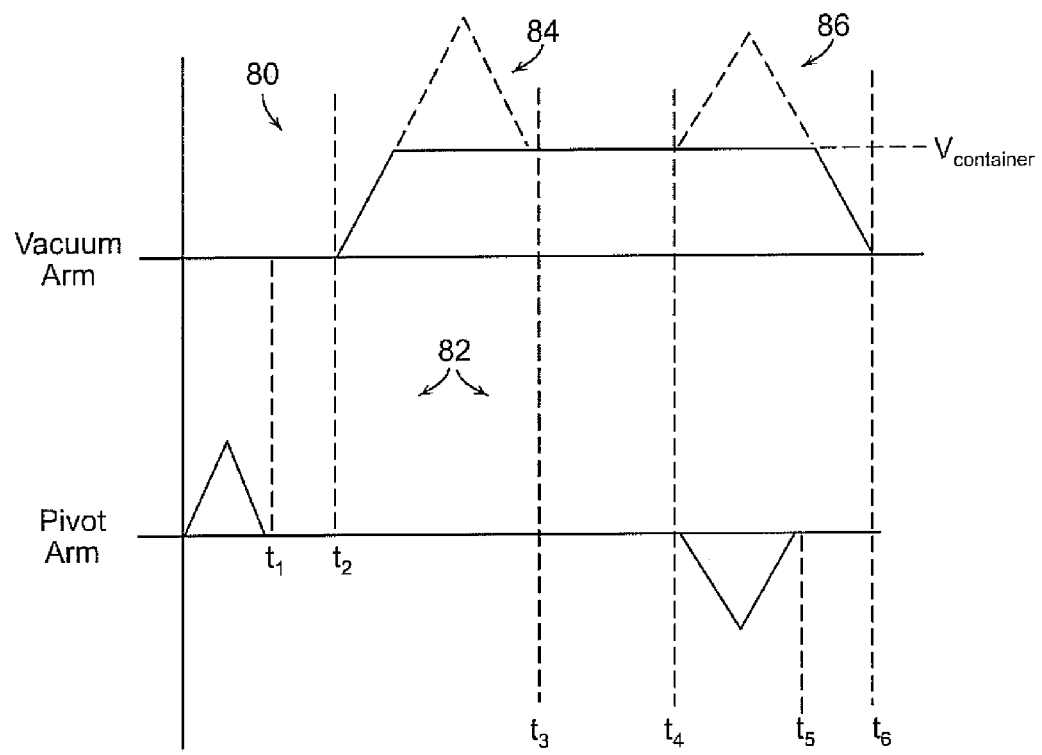
FIG. 6 shows an illustrative diagrammatic timing algorithm for a method of using the system of FIG. 1 with relatively thin outserts.

FIG. 6 shows at 80 a timing diagram of the velocity of the vacuum arm, and shows at 82 the velocity over time of the pivot arm. Again, the time up to $t_1$ shows one half of a revolution of the cam device, causing the vacuum arm to move into the outsert hopper and capture an outsert under vacuum, and the time from $t_1$ to $t_2$ shows the time in which a vacuum interface is created between the outsert and the vacuum arm. Beginning at time $t_2$ however, the vacuum arm begins to rotate without first retracting.

Figure 7:
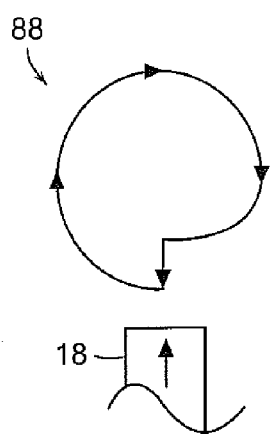
FIG. 7 shows an illustrative diagrammatic movement diagram of the rotating vacuum assembly using the timing algorithm of FIG. 6.

During the time from $t_3$ to $t_4$, the outsert is being placed on a container, with the velocity of the outsert on the suction cup matching the velocity of the container while the container is in an outsert application area on the conveyor 54. During this time, a small burst of positive air pressure may be provided (either by providing an interruption in the vacuum line or via a secondary air line) to facilitate transfer of the outsert to the article. As the vacuum arm returns to its home position (time $t_4$ through $t_6$), the pivot arm is also then returned to its non-deflected position (time $t_4$ through $t_5$). Again, the entire loop may take less than about 275 msec. As shown at 84 and 86, the velocity of the outsert on the suction cup may exceed the velocity of the container both prior to the time $t_3$ and after the time $t_4$ in certain embodiments to save time as long as the velocities match during the time $t_3$-$t_4$. FIG. 7 shows at 88 a representative path of the suction cup of the vacuum arm as it moves in toward the outsert hopper 18, then back out, and then around in its full circle. In accordance with certain embodiments, the cam device may be rotationally driven only back and forth over the range at which it achieves the desired translational movement of the pivot arm, and may not be required to operate using complete revolutions.

Figure 5:
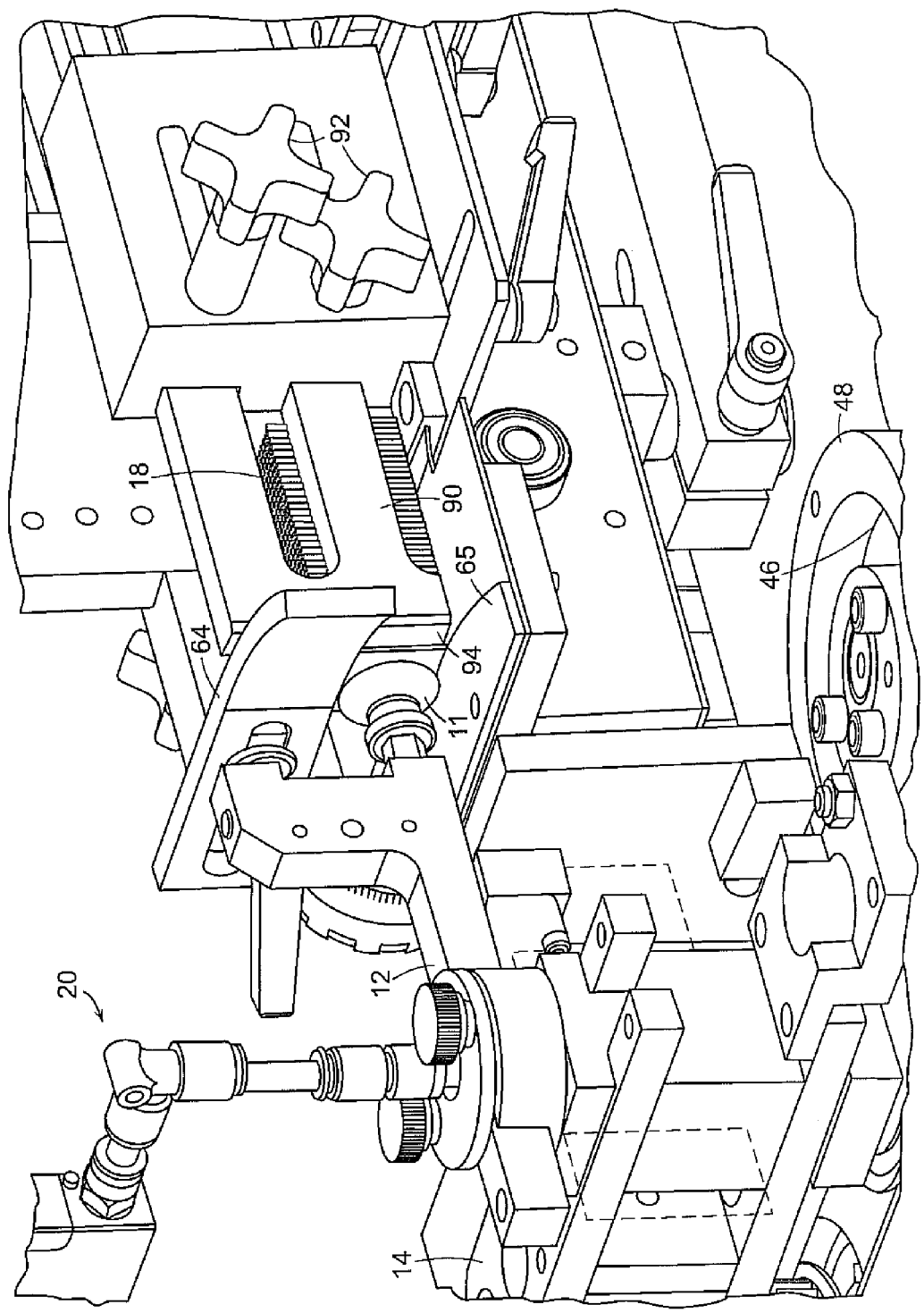
FIG. 5 shows an illustrative diagrammatic view of the rotating vacuum assembly and outsert engagement interface of the system of FIG. 1 for engaging relatively thick outserts.
Figure 8:
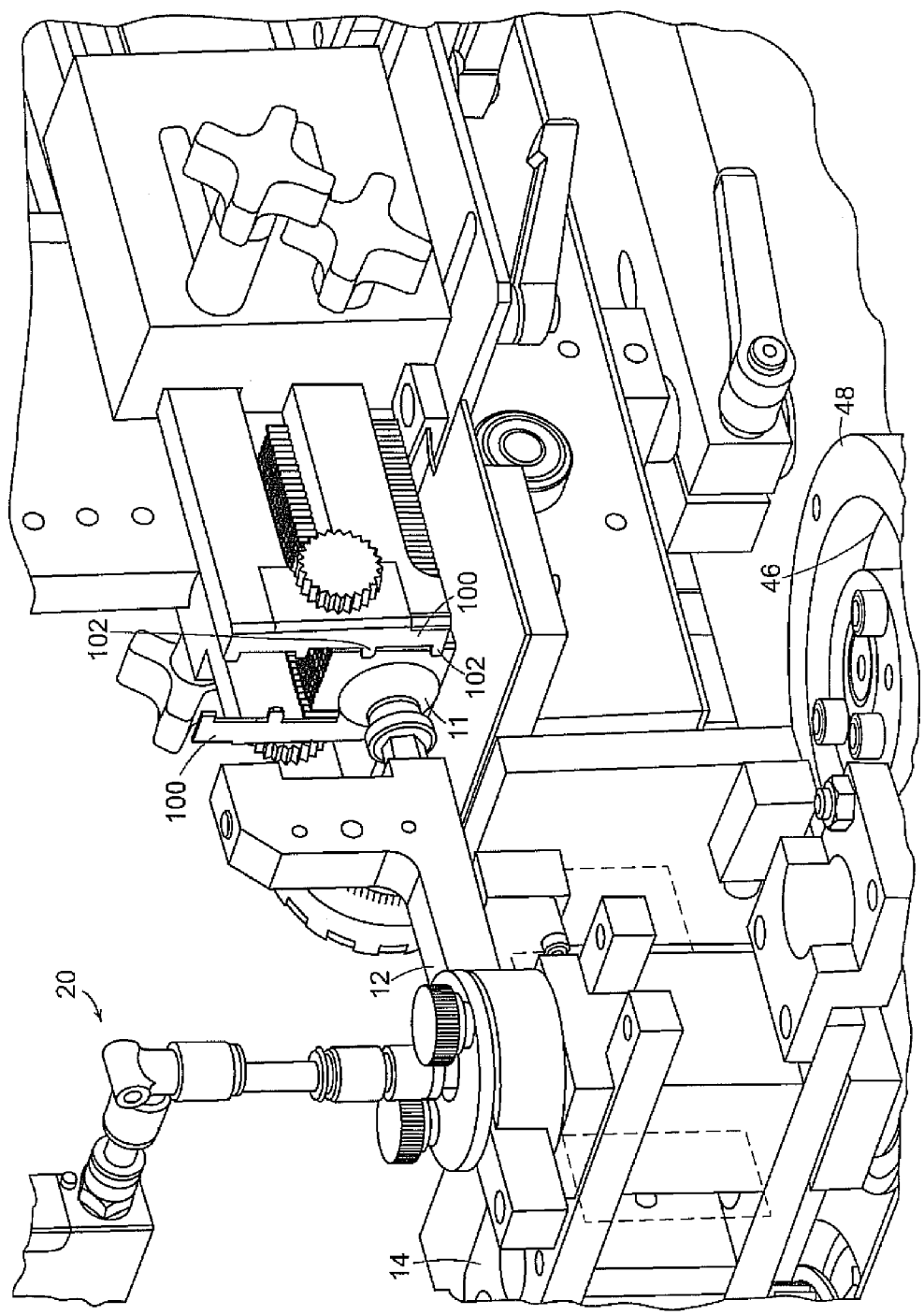
FIG. 8 shows an illustrative diagrammatic view of the rotating vacuum assembly and outsert engagement interface of a system for engaging relatively thin outserts.

Again, with reference to FIG. 5, the position of the hopper rail 90 may be adjusted (by movement of the rail and securing the position by adjustment knobs 92) to provide that the distance from a leading edge 94 of the hopper rail 90 leaves a distance between the guides 64, 65 and the leading edge 94 that is equal to the thickness of each outsert. This provides that relatively thick outserts may be skived to prevent each outsert from opening. If relatively thin outserts are used, the system may include an alternative outsert pick up arrangement as shown in FIG. 8. For example, if the outserts are too thin, the skive system of FIG. 5 may pull more than one outsert out of the hopper at a time.

FIG. 8 shows an outsert pick system that includes a vacuum arm 12 having a suction cup 11 and a pivot arm 14 as discussed above together with the vacuum source line 20 and the cam device 48. The pick system of FIG. 8, however, includes end plates 100, each of which includes one or more small fingers 102. The fingers 102 prevent the outserts from being pushed out of the hopper, yet permit each outsert to be pulled past the fingers when an outsert is pulled by the vacuum from the suction cup 11. While such a pick system may not work with relatively thick outserts (particularly if they are accordion folded), it is believed to be effective for processing relatively thin outserts.

Figure 9:
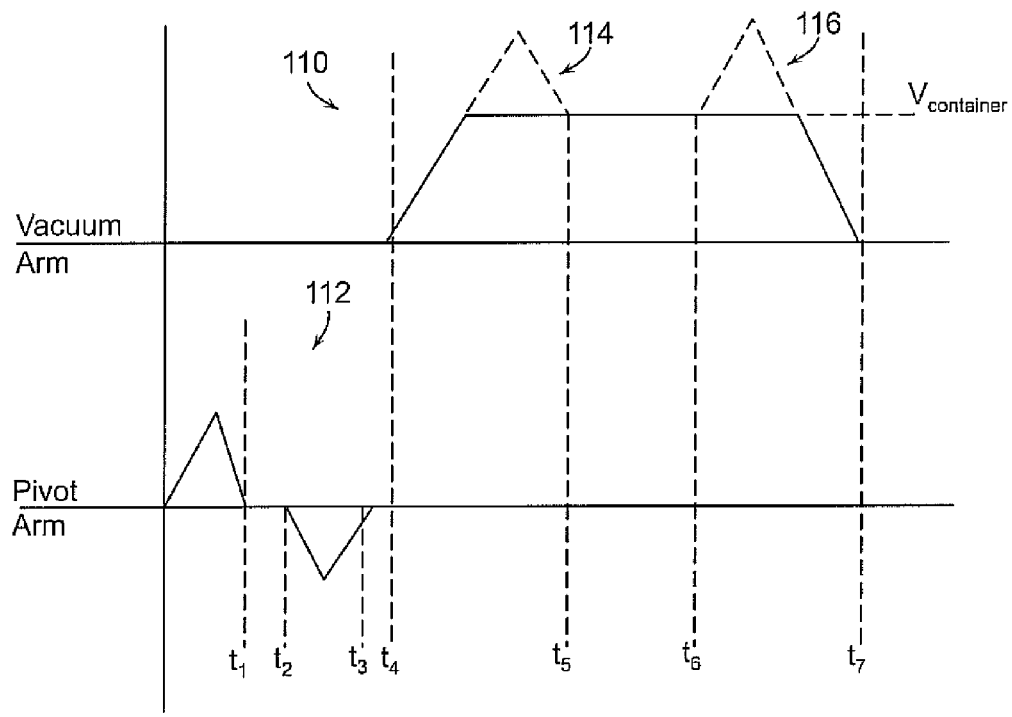
FIG. 9 shows an illustrative diagrammatic timing algorithm for a method of using the system including an engagement interface of FIG. 8.

FIG. 9 shows at 110 a timing diagram of the velocity of the vacuum arm, and shows at 112 the velocity over time of the pivot arm. The time up to $t_1$ shows one half of a revolution of the cam device, causing the vacuum arm to move into the outsert hopper and capture an outsert under vacuum. The time from $t_1$ to $t_2$ shows the time in which a vacuum interface is created between the outsert and the suction cup. The time from $t_2$ to $t_3$ shows the cup arm being withdrawn from the outsert hopper, and the time from $t_4$ to $t_7$ shows the time required for the cup arm to move its full circle (e.g., less than 200 msec), applying the outsert to a container. The entire loop may take less than about 275 msec.

Figure 10:
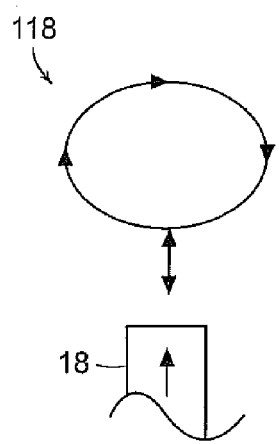
FIG. 10 shows an illustrative diagrammatic movement diagram of the rotating vacuum assembly using the timing algorithm of FIG. 9.

During the time from $t_5$ to $t_6$, the outsert is being placed on a container, with the velocity of the outsert on the suction cup matching the velocity of the container. Again, during this time, a small burst of positive air pressure may be provided (either by providing an interruption in the vacuum line or via a secondary air line) to facilitate transfer of the outsert to the article. As shown at 114 and 116, the velocity of the outsert on the suction cup may exceed the velocity of the container both prior to the time $t_5$ and after the time $t_6$ in certain embodiments to save time as long as the velocities match during the time $t_5$-$t_6$. FIG. 10 shows at 118 a representative path of the suction cup on the vacuum arm as it moves in toward the outsert hopper 18, then back out, and then around in its full circle. Again, in accordance with certain embodiments, the cam device may be rotationally driven only back and forth over the range at which it achieves the desired translational movement of the pivot arm, and may not be required to operate using complete revolutions.

Figure 11:
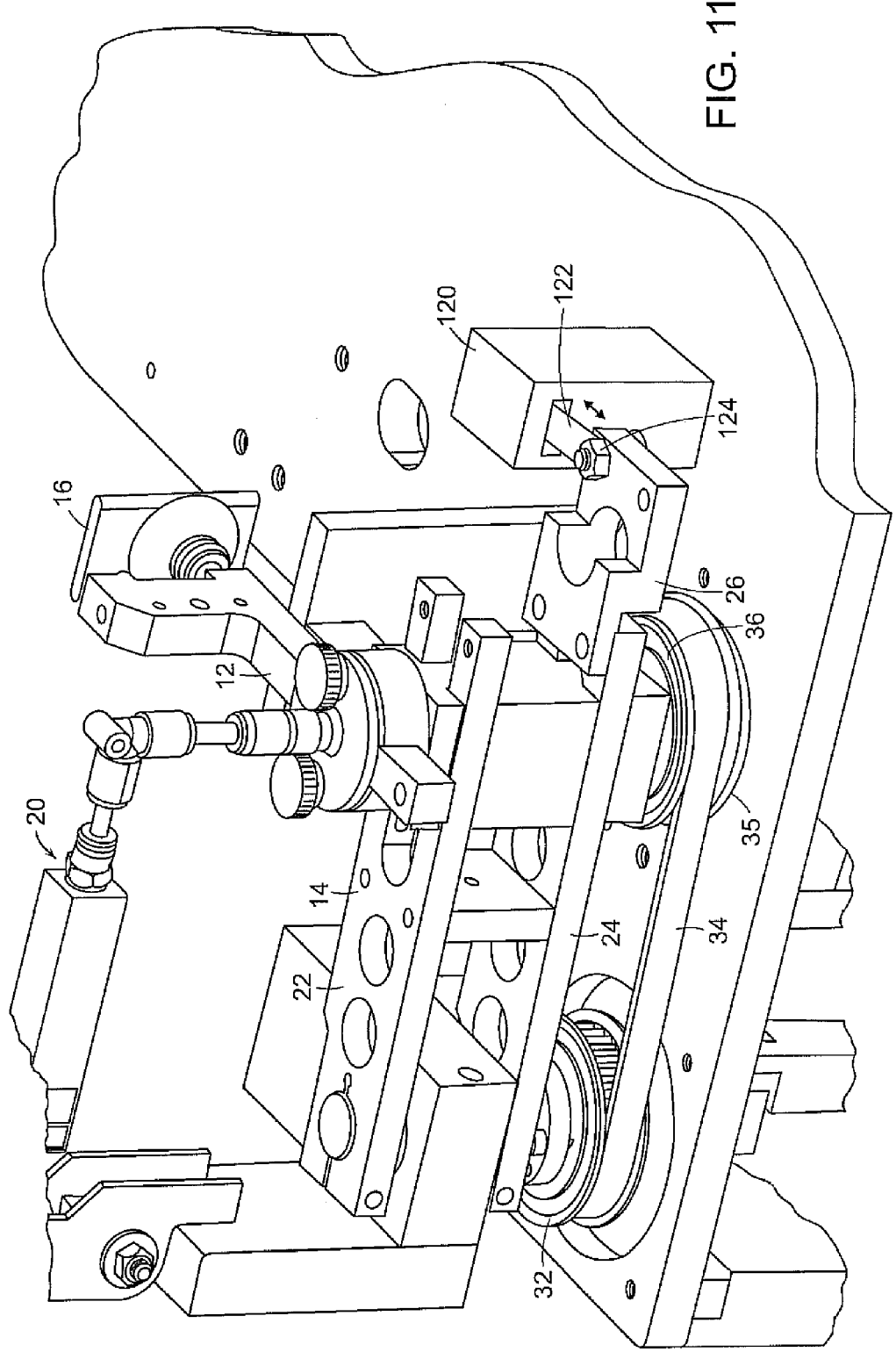
FIG. 11 shows an enlarged illustrative diagrammatic view of a rotating vacuum assembly and pivot arm of a system in accordance with a further embodiment of the invention employing a linear actuator translation device.

FIG. 11 shows a system in accordance with an embodiment of the invention (using either the outsert skive or pick systems discussed above) in which the translational movement of the pivot arm is controlled not by a cam device, but by a linear actuator. In particular, the system includes a vacuum arm 12 and suction cup 11 for capturing an outsert 16 via vacuum from a source line 20. The vacuum arm 12 is rotationally mounted on the pivot arm 14, and rotation of the vacuum arm 12 is controlled by a drive wheel 32 that drives a driven wheel 36 by a belt 34. Again, an enlarged opening 35 may be provided in a support surface that permits the driven wheel 36 to both rotate and move with the pivot arm 14 as the translation device moves the pivot arm 14.

As also shown in FIG. 11, however, the translation device includes a linear actuator 120 that includes a reciprocating drive member 122 that moves into and out of the actuator 120 upon application of electrical power. Either end of the reciprocating drive member 122 may be loosely attached, permitting a small amount of rotation of the drive member 122 with respect to either the actuator 120 or the fixture 124 by which the drive member engages the pivot arm 14. The linear actuator may include any of a linear servo motor, a solenoid or a pneumatic cylinder. In accordance with further embodiments, the translation device may include a wide range of other devices for imparting a small translation movement of the pivot arm during operation.

Figure 12:
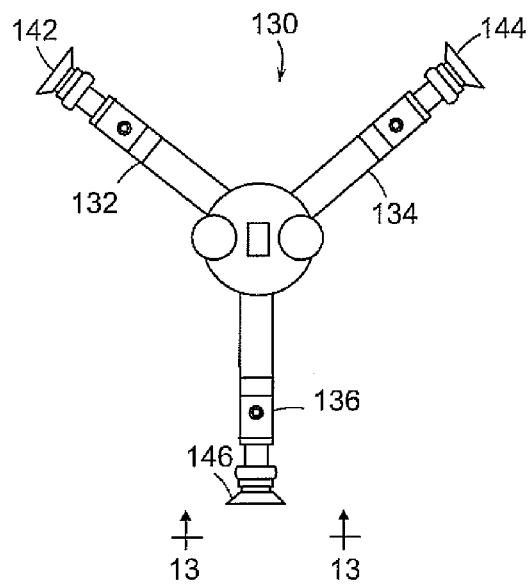
FIG. 12 shows an illustrative diagrammatic view of a rotating vacuum assembly having three vacuum arms for use in a system in accordance with a further embodiment of the invention.

As shown in FIG. 12, in accordance with a further embodiment, the vacuum assembly 130 may include multiple (e.g., three) vacuum arms 132, 134 and 136. When a vacuum assembly with more than one vacuum arm is used, the timing schedule needs to be modified to ensure that the translational movement required for one vacuum arm does not interfere with either the engagement or disengagement of outserts by the other vacuum arms. Also, the velocity of each vacuum arm when applying an outsert to a container, must match the velocity of the container (for continuous operation systems), and the vacuum control may be individualized for each vacuum arm using separate lines.

Figure 13:
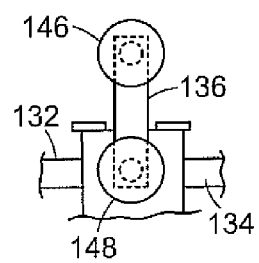
FIG. 13 shows a partial illustrative diagrammatic side view of the rotating vacuum assembly of FIG. 12 taken along line 13-13 thereof showing the use of two suction cups per vacuum arm.

Each vacuum arm may include more than one suction cup. For example, as shown in FIG. 13, each vacuum arm (e.g., 136) may include two suction cups 146, 148. Each of the other vacuum arms (132, 134) may also include two suction cups (142 and 144 are shown). The use of two suction cups facilitates disengagement of an outsert from the hopper wherein the outsert has a relatively large surface area for contacting an article, and facilitates retention of the outsert as it travels toward the article.

Figure 14:
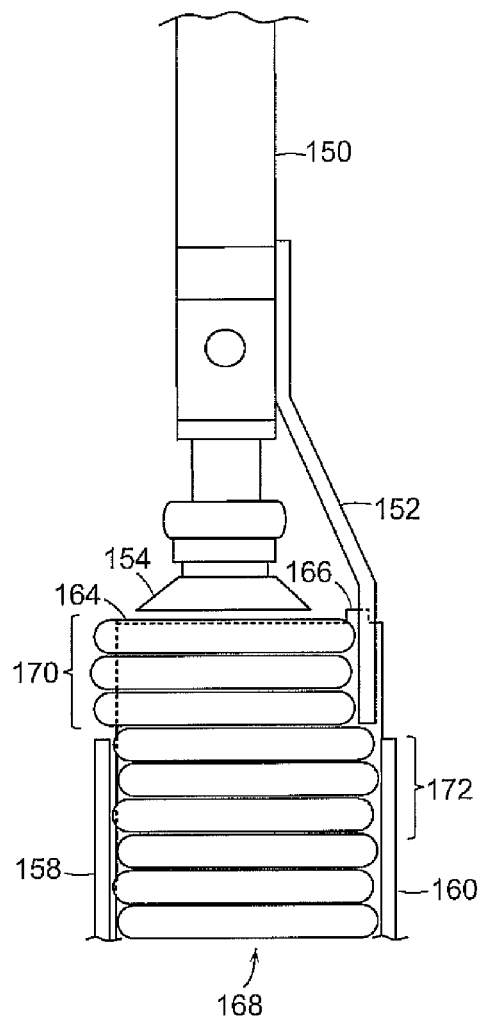
FIG. 14 shows an illustrative diagrammatic plan view of a vacuum arm of a vacuum assembly in accordance with an embodiment of the invention wherein a pusher guide is used to facilitate engagement of an outsert from the hopper.
Figure 15:
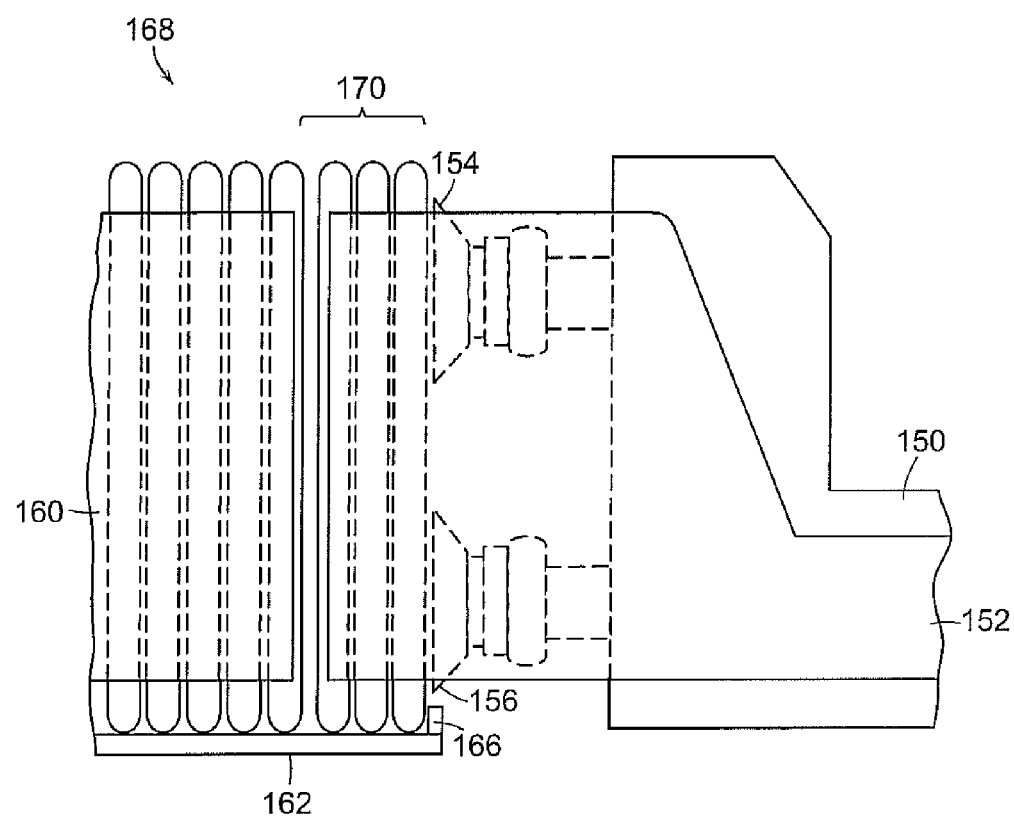
FIG. 15 shows an illustrative diagrammatic side view of a portion of the vacuum arm of FIG. 14 taken along line 15-15 thereof.

As shown in FIGS. 14 and 15, the disengagement of an outsert from a hopper may also be facilitated by the use of a pusher plate. In particular, a vacuum arm 150 may include a pusher plate 152 as well as suction cups 154, 156. The hopper sleeve may include side plates 158, 160, as well as a bottom plate 162 having end stops 164, 166 protruding therefrom to retain the outserts 168 in the hopper sleeve.

An outsert may for example, include three sections when folded, and as shown in FIG. 14, the pusher may facilitate moving the outermost outsert 170 from the hopper by pushing the outsert 170 along the direction of movement of the suction cup 154 on the vacuum arm 150. Once the outsert 170 has cleared the hopper, a biasing device (not shown) urges the next outsert 172 into the end-most position against the end stops 164, 166.

In accordance with a further embodiment, a system of the invention may include a vacuum arm 180 having one or more a suction cups 182 as well as a radial guide 184 for guiding each outsert along the path toward the conveyor 186 carrying articles 188, 190 in a direction and speed as generally indicated at "A". In particular, an outermost outsert 192 is engaged from the hopper 194 and separated from the other outserts 196 by the one or more suction cups 182 on the vacuum arm 180. As the vacuum arm 180 rotates in a direction and speed as generally indicated at "B", the engaged outsert 192 is maintained in position against the one or more suction cups 182 by the radial guide 184.

Figure 16:
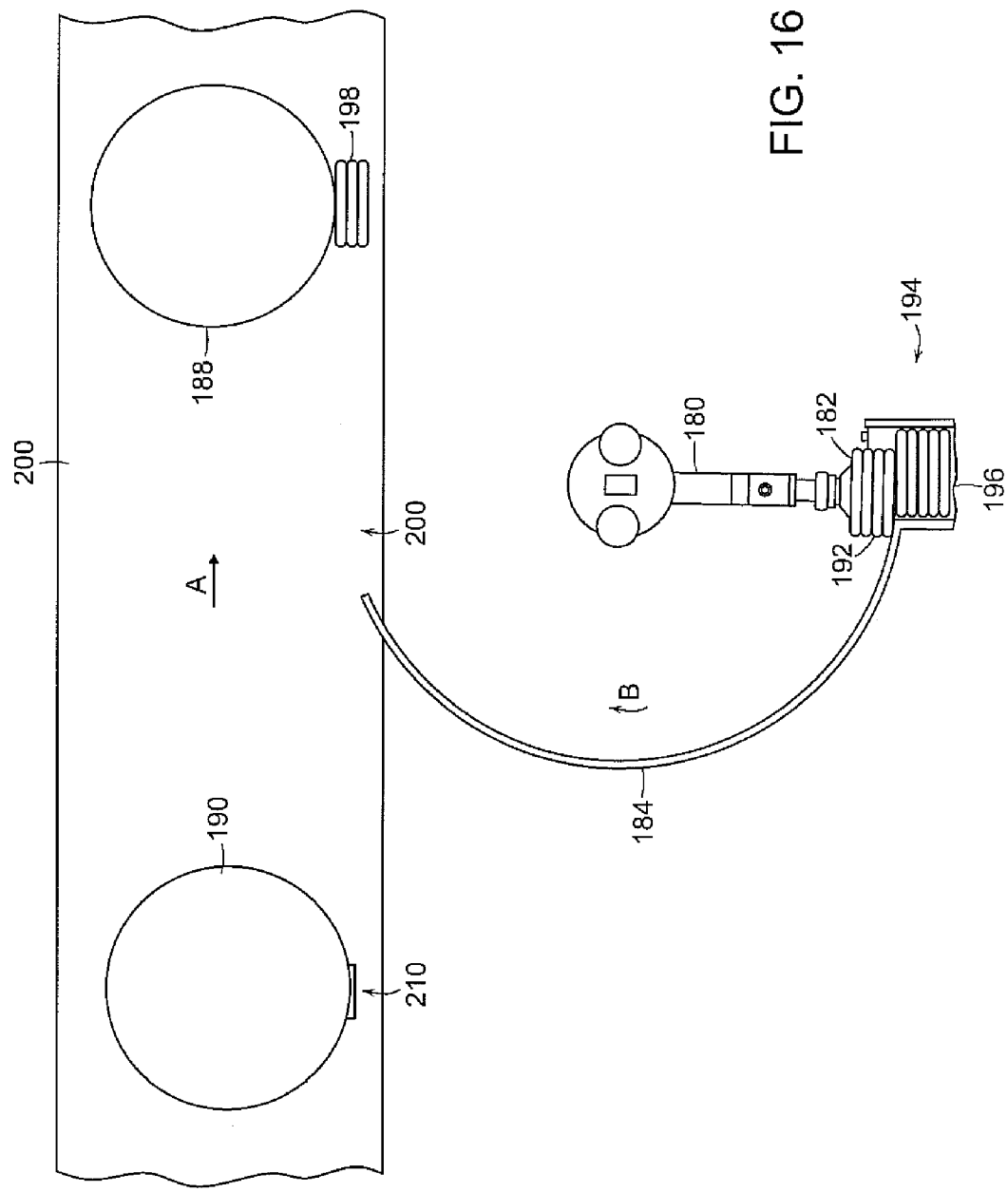
FIG. 16 shows an illustrative diagrammatic plan view of a vacuum assembly in accordance with a further embodiment of the invention wherein a fixed radial guide is used to facilitate maintaining contact between the suction cup and the outsert to be applied while the vacuum arm is rotating toward the article.
Figure 17:
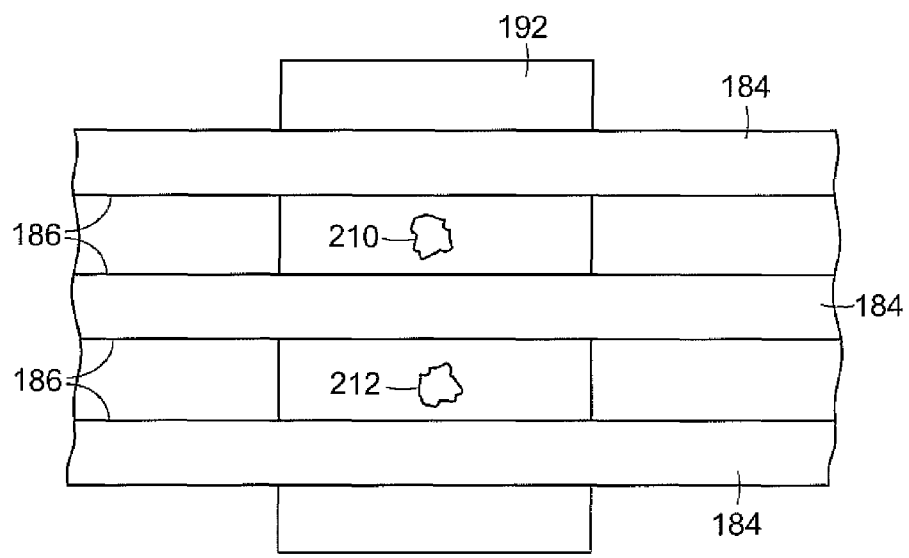
FIG. 17 shows an illustrative diagrammatic side view of a portion of the fixed radial guide of FIG. 16.

The rotational speed of the vacuum arm 180 is set such that the speed and direction "B" of the outsert 192 as it leaves the radial guide 184 in the area generally indicated at 200 is matched to the speed and direction of the articles as they pass through the area 200. This facilitates the effective application of outserts to the articles. Article 188 is shown after having had an outsert 198 applied thereto. In certain embodiments, an adhesive may be pre-applied to the articles (as shown at 210 in FIG. 16), or a glue applicator may apply an adhesive to regions 210, 212, of the outsert 192 that are exposed through slit openings 186 in the radial guide 184 as shown in FIG. 17. The radial guide 184 may be comprised of one or more guide rail elements as shown in FIG. 17.

Those skilled in the art will appreciate that numerous modifications and variations may be made to the above disclosed embodiments without departing from the spirit and scope of the present invention.

What is claimed is:

1. An outsert application system comprising:
    a vacuum assembly for accommodating passage of a vacuum to an engagement surface at an engagement location of said vacuum assembly; and
    a pivot arm that is rotatably coupled at a first end thereof to a pivot location of said vacuum assembly, said vacuum assembly being adapted to rotate with respect to the pivot arm about a first axis, a second end of said pivot arm being adapted for rotation about a second axis that is substantially parallel with said first axis, wherein said outsert application system further includes a translation device that includes a cam device that rotates with respect to third axis that is separate from both the first and second axes, wherein the rotation of the cam device causes the first axis to move with respect to the second axis as the vacuum assembly rotates about the first axis such that an outsert is transferable from a group of outserts by the vacuum assembly to an article while moving at a rotational speed that is substantially similar to a speed of movement of the article to which the outsert is to be applied.

2. The outsert application system as claimed in claim 1, wherein said third axis is substantially parallel with said first axis.

3. The outsert application system as claimed in claim 1, wherein said translation device includes a linear actuator.

4. The outsert application system as claimed in claim 1, wherein said vacuum assembly includes an arm that is adapted to rotate in a full circle about the first axis for each outsert applied to a container.

5. The outsert application system as claimed in claim 1, wherein said vacuum assembly includes a plurality of arms, each having at least one suction cup for engaging an outsert.

6. The outsert application system as claimed in claim 5, wherein said vacuum assembly includes three arms, each having two suction cups for engaging an outsert.

7. The outsert application system as claimed in claim 1, wherein the vacuum assembly includes a plurality of suction cups for engaging an outsert.

8. The outsert application system as claimed in claim 1, wherein rotation of the vacuum assembly with respect to the first axis is driven by a belt that is driven by a drive wheel that rotates about an axis that is at least substantially coincident with the second axis.

9. The outsert application system as claimed in claim 1, wherein said outsert application system further includes at least one guide to facilitate transferring outserts from an outsert hopper to the article.

10. The outsert application system as claimed in claim 9, wherein said at least one guide includes a pusher plate to facilitate removing an outsert from the outsert hopper.

11. The outsert application system as claimed in claim 9, wherein said at least one guide includes a radial guide to facilitate the maintaining of contact between the outsert and at least one suction cup of the vacuum assembly.

12. The outsert application system as claimed in claim 1, wherein said outsert application system further includes a glue station for applying glue to containers as they travel along a conveyor prior to passing an outsert application area.

13. An outsell application system comprising:
    a vacuum assembly including at least one vacuum arm for accommodating passage of a vacuum to an engagement surface at a first vacuum arm end of the at least one vacuum arm; and
    a pivot arm that is rotatably coupled at a first end of the pivot arm to a second vacuum arm end of said vacuum assembly, said vacuum assembly being adapted to rotate with respect to the pivot arm about a first axis by actuation of a first motor, said first end of said pivot arm being adapted for rotation about a second axis that is substantially parallel with said first axis and that passes through said second end of the pivot arm, wherein said outsert application system further includes a translation device that causes the first end of the pivot arm to rotate with respect to the second axis by actuation of a cam motor that drives the movement of the first end of the pivot arm as the vacuum assembly rotates about the first axis and that causes the first end of the pivot arm to move in a direction that is substantially orthogonal to the first axis as the vacuum assembly rotates about the first axis, such that an outsert is transferable from a group of outserts by the vacuum assembly to an article while moving at a rotational speed that is substantially similar to a speed of movement of the article to which the outsert is to be applied.

14. The outsert application system as claimed in claim 13, wherein said translation device includes a cam follower that is engaged within a cam path of a cam device that is coupled to the cam motor and that rotates about a third axis that is substantially parallel with said first axis.

15. The outsert application system as claimed in claim 13, wherein said translation device is provided at the first vacuum arm end of the vacuum assembly.

16. The outsert application system as claimed in claim 13, wherein said vacuum assembly includes a plurality of arms, each having at least one suction cup for engaging an outsert.

17. The outsert application system as claimed in claim 13, wherein said outsert application system further includes at least one guide to facilitate transferring outserts from an outsert hopper to the article.

18. The outsert application system as claimed in claim 1, wherein movement of the first axis with respect to the second axis is independently controllable with respect to the movement of the vacuum assembly about the first axis.

19. The outsert application system as claimed in claim 13, wherein movement of the first end of the pivot arm with respect to the second axis is independently controllable with respect to the movement of the vacuum assembly about the first axis.

20. An outsert application system comprising:
a vacuum assembly including at least one vacuum arm for accommodating passage of a vacuum to an engagement surface at a first vacuum arm end of the at least one vacuum arm; and
a pivot arm that is rotatably coupled at a first end of the pivot arm to a second vacuum arm end of said vacuum assembly, said vacuum assembly being adapted to rotate with respect to the pivot arm about a first axis by actuation of a first motor, said first end of said pivot alma being adapted for rotation about a second axis that is substantially parallel with said first axis and that passes through said second end of the pivot arm, wherein said outsert application system further includes a translation device that causes the first end of the pivot arm to rotate with respect to the second axis by actuation of a linear actuator that drives the movement of the first end of the pivot arm as the vacuum assembly rotates about the first axis and that causes the first end of the pivot arm to move in a direction that is substantially orthogonal to the first axis as the vacuum assembly rotates about the first axis, such that an outsert is transferable from a group of outserts by the vacuum assembly to an article while moving at a rotational speed that is substantially similar to a speed of movement of the article to which the outsert is to be applied.

21. The outsert application system as claimed in claim 20, wherein said vacuum assembly includes a plurality of arms, each having at least one suction cup for engaging an outsert.

22. The outsert application system as claimed in claim 20, wherein said outsert application system further includes at least one guide to facilitate transferring outserts from an outsert hopper to the article.

23. The outsert application system as claimed in claim 20, wherein movement of the first end of the pivot arm with respect to the second axis is independently controllable with respect to the movement of the vacuum assembly about the first axis.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,150,324 B2 | |
| APPLICATION NO. | : 13/324580 | |
| DATED | : October 6, 2015 | |
| INVENTOR(S) | : Dale C. Merrill et al. | |

It is certified that error appears in the above-identified patent and that said Letters Patent is hereby corrected as shown below:

In the Description of the Application:
 In column 4, line 49, please change "outsells" to --outsert--

In the Claims of the Application:
 In column 8, line 51, please change "outsell" to --outsert--

Signed and Sealed this
Sixteenth Day of February, 2016

Michelle K. Lee
*Director of the United States Patent and Trademark Office*